US012707011B1

(12) United States Patent
Kumarasamy et al.

(10) Patent No.: US 12,707,011 B1
(45) Date of Patent: Aug. 11, 2026

(54) UNIFIED MULTI-CHANNEL COMMUNICATIONS SYSTEMS AND METHODS

(71) Applicant: State Farm Mutual Automobile Insurance Company, Bloomington, IL (US)

(72) Inventors: Subha Kumarasamy, Cumming, GA (US); Jeff Linsangan, Cumming, GA (US); Amit Gupta, Normal, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 309 days.

(21) Appl. No.: 18/464,677

(22) Filed: Sep. 11, 2023

(51) Int. Cl.
*H04M 3/51* (2006.01)
*G06Q 30/01* (2023.01)
*H04L 51/56* (2022.01)
*H04M 3/42* (2006.01)

(52) U.S. Cl.
CPC .......... *H04M 3/5191* (2013.01); *G06Q 30/01* (2013.01); *H04L 51/56* (2022.05); *H04M 3/42382* (2013.01); *H04M 2201/40* (2013.01)

(58) Field of Classification Search
CPC ........... H04M 3/5191; H04M 3/42382; H04M 2201/40; G06Q 30/01; H04L 51/56
See application file for complete search history.

(56) References Cited

U.S. PATENT DOCUMENTS

| | | | | |
|---|---|---|---|---|
| 7,159,043 | B2 * | 1/2007 | Bateman | H04M 3/51 707/E17.119 |
| 7,305,438 | B2 * | 12/2007 | Christensen | H04L 51/04 709/227 |
| 8,429,231 | B2 * | 4/2013 | Wu | H04M 3/533 |
| 8,478,598 | B2 * | 7/2013 | Burckart | G10L 15/26 709/224 |
| 9,374,690 | B2 * | 6/2016 | Talwar | H04L 51/216 |
| 9,462,115 | B2 * | 10/2016 | Rand | H04M 1/656 |
| 9,578,172 | B2 * | 2/2017 | Booij | G06Q 30/016 |
| 10,469,664 | B2 * | 11/2019 | Pirat | H04M 3/58 |
| 10,498,886 | B2 * | 12/2019 | Patel | H04M 3/523 |
| 10,630,840 | B1 * | 4/2020 | Karp | G06N 5/04 |
| 10,978,071 | B2 * | 4/2021 | Graham | G10L 25/78 |
| 11,176,933 | B1 * | 11/2021 | Gundeti | H04L 12/282 |
| 11,720,835 | B2 * | 8/2023 | Matula | H04M 3/5175 705/7.14 |
| 2013/0191481 | A1 * | 7/2013 | Prevost | H04L 51/04 709/206 |

(Continued)

*Primary Examiner* — Akelaw Teshale
(74) *Attorney, Agent, or Firm* — Lee & Hayes, P.C.

(57) ABSTRACT

Described herein are systems and techniques to facilitate the efficient generation and association of data based on communications across multiple communications channels. A unified communications system may process communications exchanges using multiple communications channels and generate data that may be associated with the interactions representing the communications exchanges. The system associates the interactions with a context. The system determines an interaction interface for subsequent communication based on the context and interaction data. The system further facilitates the switch of communications channels during a communications session, tracking, storing, and updating interaction and context data to maintain a consistent communications experience for a user.

20 Claims, 8 Drawing Sheets

(56) References Cited

U.S. PATENT DOCUMENTS

| | | | | |
|---|---|---|---|---|
| 2019/0058744 | A1* | 2/2019 | O'Connor | H04M 3/5166 |
| 2020/0059560 | A1* | 2/2020 | Williams | H04M 3/5238 |
| 2021/0336949 | A1* | 10/2021 | Kohli | H04L 63/18 |
| 2022/0210106 | A1* | 6/2022 | Angeli | G06Q 10/1093 |
| 2022/0270020 | A1* | 8/2022 | Matula | H04M 3/5141 |
| 2023/0118108 | A1* | 4/2023 | Kakumanu | H04L 51/56<br>709/206 |
| 2023/0188646 | A1* | 6/2023 | Wyss | H04L 51/046<br>379/265.09 |
| 2025/0193144 | A1* | 6/2025 | Henry | H04L 51/066 |

* cited by examiner

UNIFIED MULTI-CHANNEL COMMUNICATIONS SYSTEMS AND METHODS

BACKGROUND

The capabilities of modern communications devices and networks have expanded greatly over recent years, providing alternative communication channels to users other than voice, such as video calling, text messaging, email instant messaging, etc. Often such communications channels may provide the capability to exchange data of various types using a single channel. For example, audio, video, and images may be exchanged using a text communications channel implemented using the Multimedia Messaging Service (MMS). Social media and social network applications also provide additional communications channels that often allow multimedia interaction. These communications channels are generally available to users through the operation of a single user device, such as a smartphone. The proliferation of communications technologies has greatly expanded the communications options for users of such devices.

As the number of available communication channels has grown, so has the demand by users to communicate with organizations providing goods and services using such channels. However, traditional user interaction systems are often designed for use with traditional communications channels, such as voice calls. Therefore, it may be challenging for an organization to determine the relationship of various user interactions with one another when such interactions involve different types of communications. For example, a customer may both text and place a voice call regarding a single account or item. In such situations, it may be challenging to collect and associate data from both the voice call and the text content with the customer or a particular issue or incident. Some current systems may be able to correlate synchronous communications (e.g., voice calls, chat sessions, etc.), but may not be able to efficiently and automatically integrate asynchronous communications (e.g., text messaging, social network application messaging, etc.) into such synchronous communications-oriented systems. The examples of the present disclosure are directed to overcoming these deficiencies and providing a faster and more efficient means of unifying communications and interaction data across multiple communications channels.

SUMMARY

Techniques described herein implement a unified multi-channel communications system that facilitates communications over multiple communications channels and switching between such channels while maintaining unified data and communications consistency. The unified multi-channel communications system may process communications exchanges using multiple communications channels and generate interaction data for such exchanges that may be associated with a context. The system determines an interaction interface for subsequent communication based on the context and interaction data. The system further facilitates a switch of communications channels during a communications session, tracking, storing, and updating interaction and context data to maintain a consistent communications experience for a user. A unified communications system may process communications exchanges using multiple communications channels and generate data that may then be associated with interactions. The system may associate the interactions with a context. The system determines an interaction interface for subsequent communication based on the context and interaction data. The system further facilitates the switch of communications channels during a communications session, tracking, storing, and updating interaction and context data to maintain a consistent communications experience for a user.

For example, the techniques described herein may relate to a method for exchanging, by a unified communications system processor, messaging communications with a user device using a messaging communications channel; generating and storing, by the unified communications system processor, interaction data based at least on part on the messaging communications; determining, by the unified communications system processor and based at least in part on the messaging communications, a context identifier; associating, by the unified communications system processor, the interaction data with the context identifier; detecting, by the unified communications system processor, a communications channel change request in a messaging communication received from the user device via the messaging communications channel; determining, by the unified communications system processor and based at least in part on data associated with the context identifier, an interaction interface; and based at least in part on the communications channel change request, transmitting, from the unified communications system processor to the interaction interface, instructions to initiate a voice communications session with the user device using a voice communications channel.

In further examples, the techniques described herein may relate to non-transitory computer-readable medium comprising instructions that, when executed by one or more processors, cause the one or more processors to exchange messaging communications with a user device using a messaging communications channel; generate and store interaction data based at least on part on the messaging communications; determine, based at least in part on the messaging communications, a context identifier; associate the interaction data with the context identifier; receive a communications channel change request in a messaging communication received from the user device via the messaging communications channel; determine, based at least in part on data associated with the context identifier; an interaction interface; and based at least in part on the communications channel change request, transmit instructions to the interaction interface to initiate a voice communications session with the user device using a voice communications channel.

In additional examples, the techniques described herein may relate to a unified communications system that may include one or more processors and a non-transitory memory storing computer-executable instructions that, when executed, cause the one or more processors to exchange first communications with a user device using a first communications channel; generate and store interaction data based at least on part on the first communications; determine, based at least in part on the first communications, a context identifier; associate the interaction data with the context identifier; receive a communications channel change request in a communication received from the user device via the first communications channel; determine, based at least in part on data associated with the context identifier; an interaction interface; and based at least in part on the communications channel change request, transmit instructions to the interaction interface to initiate a communications session with the user device using a second communications channel.

Further examples described herein may relate to a system for determining service status data notifications that may include means for exchanging messaging communications with a user device using a messaging communications channel; means for generating and storing interaction data based at least on part on the messaging communications; means for determining, based at least in part on the messaging communications, a context identifier; means for associating the interaction data with the context identifier; means for detecting a communications channel change request in a messaging communication received from the user device via the messaging communications channel; means for determining, based at least in part on data associated with the context identifier, an interaction interface; and means for transmitting, based at least in part on the communications channel change request, instructions to the interaction interface to initiate a voice communications session with the user device using a voice communications channel.

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

Figure 1:
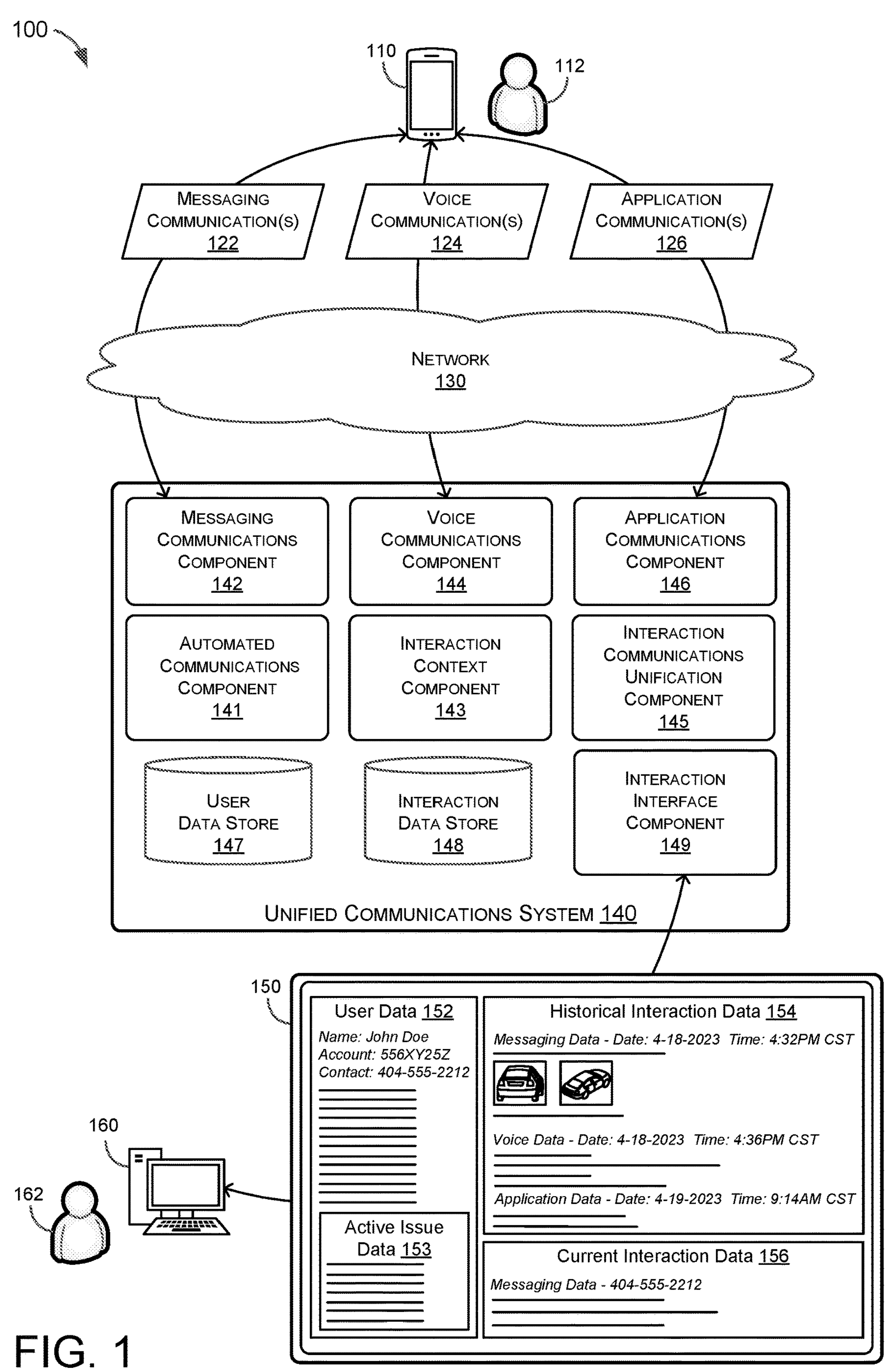
FIG. 1 illustrates an example environment in which unified multi-channel communications systems and methods may be implemented.

FIG. 1 illustrates an environment 100 in which a unified multi-channel communications system may be implemented according to examples of the instant disclosure. A user 112 may be operating a user device 110 that may be any type of communications device capable of communicating using one or more communications channels. For example, user device 110 may be a telephone, a smartphone, a wireless communications device of any other type, a desktop computer, a laptop computer, a tablet computer, a computer of any other type, etc. In a particular example, user device 110 may be a smartphone capable of communicating and/or interacting with one or more remote devices or systems using one or more communications channels, such as voice communications, messaging communications (e.g., text and/or multimedia messaging), and/or via an application (e.g., messaging within a social network application or a social media application).

A unified communications system 140 may be operated by or on behalf of an organization that may provide goods and/or services to users (e.g., customers) and/or may otherwise interact with users of user devices capable of multi-channel communications. The unified communications system 140 may include one or more components configured to perform the exemplary operations described herein. A "component" as used herein may include a hardware component, a software component, a component including both hardware and software, a software and/or hardware function of any type, a device of any type, a system of any type, and any combination thereof.

The unified communications system 140 may include a messaging communications component 142 configured to communicate or otherwise interact with user devices using one or more message communication channels. For example, the messaging communications component 142 may be configured to interact with user devices using Simple Messaging Service (SMS) communications, Multimedia Messaging Service (MMS) communications, and/or any other form of relatively direct messaging communications (e.g., as opposed to a third party application, such as messaging via a social network application or a social media application).

The unified communications system 140 may also, or instead, include a voice communications component 144 configured to communicate or otherwise interact with user devices using one or more voice communication channels. For example, the voice communications component 144 may be configured to interact with user devices using Internet Protocol (IP) telephony technologies, such as voice over IP (VOIP), and/or traditional voice communications technologies, such as plain old telephone service (POTS).

The unified communications system 140 may also, or instead, include an application communications component 146 configured to communicate or otherwise interact with user devices using one or more applications (e.g., third-party applications). For example, the application communications component 146 may be configured to interact with user devices via one or more messaging applications or components that May be provided by one or more social network applications and/or social media applications (e.g., FACEBOOK, TWITTER, LINKEDIN, etc.).

A network 130 may facilitate the communications between user devices and any one or more of the messaging communications component 142, the voice communications component 144, and the application communications component 146. The network 130 represents any number, type, and combination of wireless and/or wired networks that may be configured to facilitate communications between computing devices and/or systems. The network 130 may represent any communications means (e.g., any physical and/or logical communications connections) that allow such components to interact with other user devices and/or any intermediate systems or components, such as systems or components of third-party applications that facilitate application communications channels (e.g., servers or systems implementing messaging systems for a social network application or social media application), network provider components and/or systems (e.g., base stations, network equipment, telephony equipment's, etc.), and/or any other systems, devices, and/or components that may facilitate communications between user devices and the unified communications system 140 as described herein.

The unified communications system 140 may further include other components configured to process or otherwise perform operations based on communications associated with a user device, such as user device 110 and/or communications received via any one or more of the messaging communications component 142, the voice communications component 144, and the application communications component 146. For example, the unified communications system 140 may include an automated communications component 141 that may be configured to automatically interact with the user device 110. In examples, the automated communications component 141 may be configured to provide automated messaging interaction with the user device 110, functions as, e.g., a "chatbot," that responds to initial messaging communications from the user device 110 in order to determine the appropriate routing for subsequent messages from the user device 110.

For example, the automated communications component 141 may perform an analysis of a received message to determine a destination system to which to provide the received message and/or subsequently received messages from the same user device. A destination system may be associated with a particular geographical region and/or organizational function. In examples, the automated communications component 141 may process a message received from the user device 110 using natural language processing (NLP) and/or other text analysis operations to determine the intent, subject, and/or other properties associated with the message. Based on these message properties, the automated communications component 141 may determine a destination system to which to direct the message and/or subsequent messages from the user device 110 (e.g., message associated with the same interaction and/or the same context). Alternatively, the automated communications component 141 may engage in an interaction with the user 112 of the user device 110 by sending a query message to the user device 110, such as a "How may I assist you today?" message. The automated communications component 141 may then analyze the response using NLP and/or other text processing operations to determine an intent or subject to determine a destination system. Alternatively, the automated communications component 141 may provide explicit options to the user device 110, such as "Reply with 1 to open a new account, 2 for help with an existing account, 3 for general questions," etc.

In various examples, the automated communications component 141 may also use other information to determine a destination system, such as an identifier associated with the user device 110 that may be received in metadata or other data associated with the message (e.g., a telephone number, an International Mobile Subscriber Identity (IMSI), an address (e.g., IP address), etc.). The automated communications component 141 may use this identifying information to determine further information, such as an identity of the user 112 and/or services associated with the user 112 (e.g., based on matching the telephone number of the user device 110 to a telephone number and/or services indicated in account data associated with the user 112).

The automated communications component 141 may execute interaction operations using any of the available communications channels to determine an appropriate destination system for communications from the user device 110. For example, the automated communications component 141 may provide an automated voice interaction service (e.g., via the voice communications component 144) that detects and processes speech input from the user 112 and/or that provides a menu of options for the user 112 to select from using touch tones transmitted by the user device 110. In another example, the automated communications component 141 may provide automated textual interaction (e.g., via the application communications component 146) using an application messaging system to collect information from the user 112 that may be used to determine a destination system. Any other forms of automated interaction with the user 112 via the user device 110 and/or any intermediate systems or components may be used by the automated communications component 141 to determine a destination system.

The automated communications component 141 may forward or otherwise direct the user device 110 to any destination system or component. In the example of FIG. 1, the automated communications component 141 may forward communications to other components of the unified communications system 140, but in other examples, the automated communications component 141 may forward communications to components and/or systems outside of the unified communications system 140 based on its destination determination operation(s).

The unified communications system 140 may further include an interaction context component 143. A particular set of messages or other communications exchanged between the unified communications system 140 and a user device (e.g., user device 110) may be referred to herein as an "interaction." The content of an interaction may be associated based on time, such as a time period during which the interaction occurs. For example, a set of messages (e.g., SMS or MMS messages) exchanged between the unified communications system 140 and the user device 110 may be associated with one another as an interaction because they all occurred within a bounded period of time outside of which there was no other message exchanged between the unified communications system 140 and the user device 110.

The unified communications system 140 may determine this bounded time period as beginning at the time at which the first message was received from the user device 110 and ending at the time at which the last message was received from the user device 110 when no subsequent message was received for at least a threshold period of time. For example, all messages exchanged with the user device 110 starting with a first message received at a first time and a last message received at a final time, after which no messages were received from the user device 110 for at least an hour, may be associated with a particular interaction. Other bounds of an interaction may be used, such as associating an individual voice communications session (e.g., voice call) with a single interaction, an application communications session with a single interaction, etc.

Each interaction may include an identifier based on the participants in the interaction and the type of interaction. For example, an interaction identifier may include data representing the number associated with the source user device, data representing the destination number called or messaged by the source user device, and data representing the type of communications (e.g., messaging, voice, application, etc.). The interaction identifier may further include one or more pieces of data to make the interaction identifier unique among interaction identifiers, such as a timestamp of the initial communication in the interaction (e.g., source telephone number+destination telephone number+communications channel type+timestamp) or a uniquely generated identification number of any type (e.g., source telephone number+destination telephone number+communications channel type+unique interaction number, etc.). To ensure clear differentiation between interaction identifiers and context identifiers, an interaction identifier may incorporate a context identifier (described in more detail below) upon determining a context with which the interaction is to be associated (e.g., interaction identifier+context identifier).

Interaction data may include a particular representative or operator participating in the interaction. For example, as described in more detail herein, a particular interaction interface may be used by an operator of the unified communications system 140 to interact with the user device 110. An indication of this particular interaction interface and/or the associated operator may be stored with the interaction data at an interaction data store 148 for use as described in more detail below.

Each interaction may be associated with a context associated with the particular user and/or user device. A context may represent the particular purpose or subject of the associated interactions and/or related data. For example, a context may represent a particular customer claim, order, complaint, etc., with which the interactions associated with that context are related. The interaction context component 143 may assign a context identifier for use in associating interactions with the context and/or for representing interaction data and/or other data associated with the context. In particular examples, the context identifier may be based on other data. For example, a context identifier may be a combination of the source and destination telephone numbers associated with the initial interaction that initiated the generation of the context identifier (e.g., the number associated with the source user device and the destination number called or messaged by the source user device). Alternately or additionally, a context identifier may be based on an account number, a policy number, a username, a billing identifier, etc. The context identifier may further include one or more pieces of data to make the identifier unique among context identifiers, such as a timestamp of the initial communications (e.g., source telephone number+destination telephone number+timestamp) or a uniquely generated identification number of any type (e.g., source telephone number+destination telephone number+unique context number, etc.). Any other means of generating a context identifier and/or ensuring each context identifier is unique are contemplated for use by the unified communications system.

A context may have an active or inactive status. For example, if the issue associated with a context has been resolved, input may be provided by the user 112 and/or another user or operator of the system 140 that may cause the data associated with the context to include an "inactive" or "resolved" identifier. Alternatively or additionally, a context may be automatically set as "inactive" after a period of time during which no further interactions were associated with the context. For example, if there have been no interactions associated with a particular context for 24 hours, 48 hours, a week, a month, etc., the unified communications system 140, in particular examples the interaction context component 143, may set an activity indicator in context data for that context to "inactive." Context data may include a timer or timestamp field that may be reset with each newly associated interaction, thereby restarting a timer that may be used to determine if a threshold amount of time has passed since a most recent interaction has been associated with the context.

The interaction context component 143 may receive a communication from the user device 110, in some examples via the automated communications component 141. The interaction context component 143 may determine whether the communication is associated with an ongoing interaction. For example, the interaction context component 143 may determine whether there is an ongoing active interaction with which the communication may be associated (e.g., an interaction between the same source number and/or device and the same destination number and/or system of the same communications channel type). If so, the interaction context component 143 may associate this interaction with the existing active interaction. If not, the interaction context component 143 may generate a new interaction for this communication with which future communications May be associated. The interaction context component 143 may store and/or update interaction data to associate the communication with a particular interaction using the interaction data store 148.

The interaction context component 143 may also, or instead, determine whether there is an active context with which the communication may be associated. For example, the interaction context component 143 may determine if identifiers determined based on communication data (e.g., source telephone number+destination telephone number) match a context identifier (e.g., source telephone number+destination telephone number+timestamp) for an active context (e.g., context data include an indication that the context is active). If so, the interaction context component 143 may associate the received communication with the context and forward the context data, including, in examples, associated interaction data, to one or more other components of the unified communications system 140. The interaction context component 143 may store and/or update interaction data to associate the interaction and/or the communication with the context identifier using the interaction data store 148.

The unified communications system 140 may further include an interaction communications unification component 145. The interaction communications unification component 145 may receive and/or collect information associated with a set of one or more historical and/or ongoing interactions for presentation and use by an operator of the unified communications system 140. For example, the interaction context component 143 may forward a communication along with interaction and context data to the interaction communications unification component 145. The interaction communications unification component 145 may use this data to determine user data, for example, by retrieving user data for a user determined to be associated with the data received from the interaction context component 143 from a user data store 147. As used herein, "user data" may include any data associated with a particular user of any type, including account data, customer data, policy data, claims data, purchase history, etc. The interaction communications unification component 145 may then process the data associated with the particular context and/or interactions to determine data that may be used to generate an interaction interface and/or facilitate further interaction with the associated user.

For example, the interaction communications unification component 145 may determine and/or retrieve user data from the user data store 147 for the user associated with interaction and/or context data received from the interaction context component 143. The interaction communications unification component 145 may also, or instead, determine and/or retrieve interaction data from the interaction data store 148 for the interactions associated with interaction and/or context data received from the interaction context component 143. The interaction communications unification component 145 may also, or instead, determine a particular interaction interface and/or one or more operators of the unified communications system 140 associated with interaction and/or context data received from the interaction context component 143. The interaction communications unification component 145 uses this data and/or any other data that may be generated or otherwise obtain based on data received from the interaction context component 143 to generate interface data that may then be transmitted to an interaction interface component 149.

The interaction interface component 149 may generate and/or execute an interaction interface, such as interface 150. The interface 150 may allow an operator of a computing system to view and manipulate data associated with one or more interactions. For example, the interface 150 may be generated and/or transmitted to an operator device 160 that may be operated by an operator 162 associated with the unified communications system 140. The interface 150 may include data generated and/or determined by the components of the unified communications system 140 as described herein.

For example, the interface 150 may include user data 152 that may, e.g., have been retrieved from the user data store 147 by the interaction communication unification component 145 and/or one or more other components of the unified communications system 140. Included in the user data 152 may be specific data relating to a particular issue or subject associated with the user data 152, represented here as active issue data 153.

The interface 150 may further include historical interaction data 154 that may, e.g., have been retrieved from the interaction data store 148 by the interaction communication unification component 145, the interaction context component 143, and/or one or more other components of the unified communications system 140. The historical interaction data 154 may include indications of the type of communication, transcriptions and/or reproductions of the content of the communications, and actual content of such communications (e.g., images, video files, audio files, etc.). The historical interaction data 154 may further include data associated with the represented interactions, such as timestamps and/or duration of the interaction and participant data (e.g., operator identifier, interaction interface identifier, user identifier, etc.).

The interface 150 may further include current interaction data 156 that may, e.g., have been received from one or more communications components of the system 140. The current interaction data 156 may include an indication of the type of communication, transcriptions and/or reproductions of the content of the communications exchanged thus far, and actual content of such communications (e.g., images, video files, audio files, etc.). The current interaction data 156 may further include data associated with the represented interactions, such as timestamps and/or duration of the interaction and participant data (e.g., operator identifier, interaction interface identifier, user identifier, etc.). The current interaction data 156 may further include controls allowing the operator 162 to generate communications for transmission to the user (e.g., user device 110) by providing input to the current interaction data 156. Alternatively or additionally, the operator 162 may provide input using other means (e.g., another control on the interface 150, a microphone on a headset, etc.) that may then be reflected in the current interaction data 156 in real-time or near real-time.

The communications exchanged by a user and an operator of a unified communications system may take various forms and the interactions associated with a particular context may be of various types. A user may decide to switch communications channels while an interaction is ongoing, thereby generating additional interactions of different types for the same context. Non-limiting examples of the various types of communications exchanges facilitated by the disclosed systems and methods may be described in reference to FIG. 1.

The user 112 may operate the user device 110 to generate a message (e.g., included in messaging communications 122). For example, the user device 110 may generate a text message to a destination number associated with the unified communications system 140. This message may be received, via the network 130, at the messaging communications component 142. The messaging communications component 142 may provide the message to the automated communications component 141 that may determine (e.g., based on the received message and/or after exchanging further messages with the user device 110 via the messaging communications component 142 and the network 130) to forward the message to the interaction context component 143 or otherwise generate data based on the message for transmission to the interaction context component 143.

The interaction context component 143 may determine that the received message is not currently associated with an ongoing interaction. For example, the interaction context component 143 may determine that there is no active interaction of the messaging type associated with the combination of the source number (e.g., telephone number of the user device 110) and the destination number (e.g., telephone number messaged by the user device 110). The interaction context component 143 may, in response, generate a new interaction identifier and store the message and/or data based on the message along with the associated interaction identifier at the interaction data store 148.

The interaction context component 143 may next determine if there is an active context with which the interaction may be associated. For example, the interaction context component 143 may determine that there is no active context for the interaction based on determining that there is no active context associated with the combination of the source number (e.g., telephone number of the user device 110) and the destination number (e.g., telephone number messaged by the user device 110). The interaction context component 143 may, in response, generate a new context identifier and update the interaction data associated with the interaction identifier with the context identifier at the interaction data store 148.

The interaction context component 143 may provide the interaction and context data to the interaction communications unification component 145 that may use such data to obtain or otherwise determine user data and/or any related data that may be used to generate an interaction interface. The interaction communications unification component 145 may further determine the appropriate interaction interface for exchanging further communications with the user 112. In examples, because the received message is an initial communication for both the interaction and the context, there may be no particular interface determined for this interaction. Thus, the interaction communications unification component 145 may determine the next available interaction interface (e.g., where new interactions and contexts are addressed on a first-come first-served basis). Alternatively, the user data associated with the user 112 (e.g., account data, issue data, claim data, etc.) may include an indication of a particular interaction interface (e.g., an interface operated by a particular operator of the unified communication system 140, executed on a particular device or component of the unified communication system 140, etc.).

The interaction communications unification component 145 may determine the appropriate interface associated with the interaction interface component 149 and may transmit instructions and interaction, context, and/or user data associated with the received message to the component 149. The interaction interface component 149 may generate the interface 150 with the user data 152 associated with the user 112, historical interaction data 154 (that may be substantially blank or may include interaction data for interaction from previous contexts associated with the user 112), and current interaction data 156 that may represent the message received from the user device 110 and associated message data.

The operator 162 may interact with the interface 150 to exchange further messaging communications with the user device 110. Such messages originating at the interface 150 may be transmitted from the interface 150 (e.g., under control of the operator 162) via the interaction interface component 149 to the interaction communications unification component 145 and/or the interaction context component 143, one or both of which may associate such messages with the interaction identifier associated with the initial message and the context identifier generated as described above, storing such data at the interaction data store. Such messages may further be transmitted to the messaging communications component 142 for transmission to the user device 110 via the network 130. In this example, the initial message described above and the subsequent messages associated with the same interaction are represented as messaging communications 122 in FIG. 1.

Subsequent messaging communications from the user device 110 may be evaluated as described herein to determine interaction and/or context associations. For example, a subsequent message transmitted by the user device 110 may be received at the interaction context component 143 via the network 130 and the messaging communication component 142. The interaction context component 143 may determine that the subsequent message is associated with an active interaction of the messaging type associated with the combination of the source number (e.g., telephone number of the user device 110) and the destination number (e.g., telephone number messaged by the user device 110). The interaction context component 143 may, in response, store and associate the message and/or associated data with the interaction identifier (e.g., at the interaction data store 148), updating the interaction data for that interaction. For example, the interaction context component 143 may associate the subsequent message and/or associated data with the interaction identifier associated with the messaging communications 122.

The interaction context component 143 may next determine that the subsequent message is associated with an active context. For example, the interaction context component 143 may determine that there is an active context associated with the interaction associated with the messaging communications 122 based on the interaction data and/or by determining that there is an active context associated with the combination of the source number (e.g., telephone number of the user device 110) and the destination number (e.g., telephone number messaged by the user device 110).

The interaction context component 143 may provide the updated interaction and context data (e.g., updated with subsequent message data) to the interaction communications unification component 145 that may use such data to determine an appropriate interaction interface. For example, a particular interaction interface may be indicated in the context data. The appropriate interface may be associated with the interaction interface component 149 and, therefore, the interaction communications unification component 145 may transmit instructions and updated interaction, context, and/or user data associated with the received message to the component 149. The interaction interface component 149 may update the current interaction data 156 of the interface 150 with the updated data. Messaging communications may continue to be exchanged in a similar manner and context and interaction data may be updated accordingly, until a timeout occurs where no messages are received from the user device 110 and/or until the context and/or interaction are updated to be inactive.

During the interaction associated with message communication 122, the user device 110 may transmit messaging content that indicates a desire to change communications channels. For example, the interaction communications unification component 145 may be configured to recognize particular content as a request to change communications channels. The interaction communications unification component 145 may be configured to recognize specific codes, text, voice commands, etc. that may initiate a communications channel change operation. Alternatively or additionally, the interaction communications unification component 145 may be configured to use NLP and/or other language processing techniques to identify a request to change communications channels.

To continue the messaging example, during the interaction associated with the messaging communications 122, the user 112 may operate the user device 110 to transmit a message that includes data associated with a request to switch to a voice communications channel (e.g., "please call me"). The interaction communications unification component 145 may, in response to detecting such a request, transmit instructions to the interaction interface component 149 instructing that component to present a notification of this request at the interface 150. This notification may include instructions for the operator 162 to place a voice call to the user device 110. Alternatively, the interaction communications unification component 145 may, in response to detecting a call request, automatically initiate a voice call via the voice communications component 144. The interaction communications unification component 145 may initiate the call using the voice communications component 144 and/or the network 130. The interaction communications unification component 145 may further instruct the interaction context component 143 of this initiated call, causing the interaction context component 143 to generate an interaction identifier for the call, associated the new voice interaction with the current context, and/or store such data and related data at the interaction data store 148.

In examples, the interaction communications unification component 145 may determine a status of the interface 150 prior to initiating a call to the user device 110. For example, the interaction communications unification component 145 may first ensure that the interface 150 does not indicate that the operator 162 is already on a call. The interaction communications unification component 145 may further determine if there is a call queue for the interface 150 and/or the operator 162 and, if so, a placement for a call to the user device 110 in that queue. For example, because an interaction is ongoing with the user device 110, a call to the user device 110 may be given higher priority.

In another example, the user 112 may operate the device 110 to place a call to the unified communications system 140 during the interaction associated with the messaging communications 122. This call and/or data associated therewith, represented as voice communications 124 in FIG. 1, may be received at the interaction context component 143. The interaction context component 143 may determine that the call is not currently associated with an ongoing interaction. For example, the interaction context component 143 may determine that there is no active interaction of the voice communications type associated with the combination of the source number (e.g., telephone number of the user device 110) and the destination number (e.g., telephone number messaged by the user device 110). The interaction context component 143 may, in response, generate a new interaction identifier for the voice communications 124 and store voice call data with the associated interaction identifier at the interaction data store 148.

The interaction context component 143 may next determine if there is an active context with which this voice interaction may be associated. For example, the interaction context component 143 may determine that there is an active context for the interaction based on determining that the combination of the source number (e.g., telephone number of the user device 110) and the destination number (e.g., telephone number called by the user device 110) are represented in an active context identifier. The interaction context component 143 may, in response, associate this voice interaction identifier with the corresponding context identifier at the interaction data store 148.

The interaction context component 143 may forward this call and/or call data (e.g., voice communications request), along with interaction and/or context data, to the interaction communications unification component 145. The interaction communications unification component 145 may then determine, based on the context, the appropriate interface. For example, the interaction communications unification component 145 may determine the interface 150 is associated with the context associated with the voice communications 124 (e.g., where the interface 150 was previously engaged in the interaction associated with the messaging communication 122 that is associated with the same context). The interaction communications unification component 145 may then route the call to the interface 150, in some examples, after ensuring that the operator 162 is available to handle the call based on data associated with the interface 150.

While the interaction associated with the voice communications 124 is ongoing, the unified communications system 140 (e.g., one or more components thereof) may transcribe the call and/or generate data to be associated and stored with the interaction associated with the voice communications 124. For example, the interaction communications unification component 145 and/or the interaction context component 143 may record the call and/or perform NLP and/or other language processing on the audio data of the voice communications 124 to generate a text representation of the call that may then be stored and presented on an interface as interaction data (e.g., historical interaction data).

Upon termination of the call represented by the voice communications 124, the associated interaction may be marked "inactive." Thus, this call and its associated data (e.g., transcribed into text) may be presented in an interface (e.g., interface 150) as historical interaction data. Similarly, in response to detecting a subsequent interaction associated with the same context (e.g., the voice communications 124 interaction), the unified communications system 140 (e.g., the interaction context component 143) may update the previous interaction associated with the messaging communications 122 as "inactive."

In a similar manner, applications communications channels may be integrated into the unified communications system 140. For example, the user device 110 may initiate, or request initiation while communicating using another communications channel, applications communications 126 via the network 130 and the application communications component 146. The interaction context component 143 and the interaction communications unification component 145 may address such communications similarly, generating a new interaction identifier for the application communications 126 and associating the interaction with a (e.g., new or existing) context.

By allowing automated and unified communications across multiple communications channels while accurately identifying and associating such communications, the systems and techniques described herein facilitate the faster and more efficient implementation of communications between users and system operators. The use of automated interaction and context correspondence determinations ensures that the appropriate personnel and systems may remain engaged with a user and data associated with a user and/or a situation is available regardless of the source communications channel. Moreover, using the unified multi-channel communications systems and techniques described herein may improve the performance of associated systems and operations by reducing or eliminating the need for manual operations to determine communications correspondences across communications channels and appropriate destination interfaces for communications of all types. For example, the disclosed systems and techniques provide a faster and more efficient way to retrieve and utilize communications data compared to traditional techniques of manually collecting data from communications of different types and relying on human operators to determine correspondences and determine recipient operators.

Figure 2:
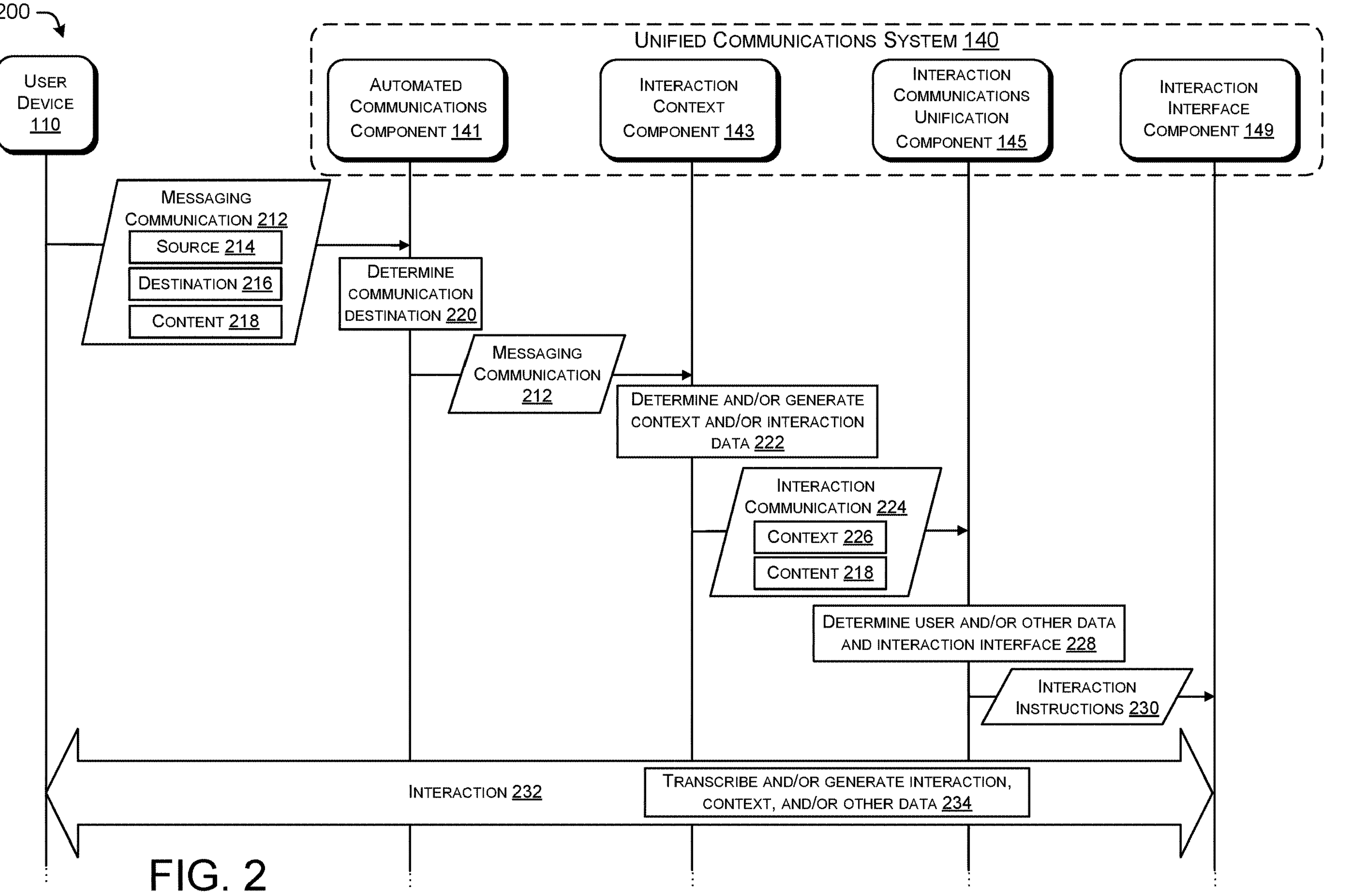
FIG. 2 is a diagram of an illustrative signal flow associated with unified multi-channel communications systems and methods according to the examples described herein.

FIG. 2 is an exemplary signal flow 200 of various messages that may be exchanged and operations that may be performed in a system performing unified multi-channel communications methods. In examples, one or more operations and signals of the signal flow 200 may be implemented by a unified multi-channel communications system, such as by using one or more of the components and systems illustrated in FIG. 1 and described above and/or by using one or more of the components and systems illustrated in FIG. 8 and described below. For example, reference may be made in this description of the signal flow 200 to devices, entities, functions, components, and/or interfaces illustrated in FIG. 1 and described in regard to that figure, including one or more components and systems associated with the unified communications system 140. One or more such components and systems can also, or instead, include those associated with the computing device 800 illustrated in FIG. 8. In other examples, one or more operations and signals of the signal flow 200 may be implemented by a combination of components described in regard to these systems and/or other systems. However, the signal flow 200 is not limited to being implemented by such components and systems, and the components and systems described herein are not limited to implementing the operations and signals of the signal flow 200.

Signal flow 200 illustrates an example of signals that may be exchanged and operations that may be performed during an exchange of communications between a user device and a unified communications system. In this example, the user device 110 may transmit a messaging communication 212 to the unified communications system 140. The messaging communication 212 may include a source 214 that may be a telephone number, IMSI, IP address, network address, or any other type of identifier or address of the user device 110. The messaging communication 212 may also include a destination 216 that may be a telephone number, IMSI, IP address, network address, or any other type of identifier or address of the unified communications system 140 and/or an associated system in communication with the unified communications system 140. The messaging communication 212 may also include content 218 that may be any type of message content. For example, where the messaging communication 212 is an SMS message, the content 218 may be text content. Where the messaging communication 212 is an MMS message, the content 218 may be text, video, audio, or image content. While the messaging communication 212 is used in this particular example, communications signals of any other type may be similarly exchanged and processed according to the disclosed examples. Thus, where the communication 212 is a voice communications, the content 218 may be audio data representing voice communications.

The messaging communication 212 may be received at the automated communications component 141. At operation 220, the automated communications component 141 may determine a destination for the communication. For example, as described above, the automated communications component 141 may analyze the content 218 and/or perform additional interaction operations to obtain additional data from the user device 110 to determine a destination system for the communication 212 and/or related communications. For instance, the automated communications component 141 may request additional data from the user by transmitting one or more messages to the user device 110 requesting response(s) from the user. In examples, the automated communications component 141 may also, or instead, use other data to determine the destination. For instance, the automated communications component 141 may determine a user account based on the source 214 and may then determine a destination system associated with a service or product indicated in the user account.

In this example, the automated communications component 141 may determine, at operation 220, to transmit the messaging communication 212 to the interaction context component 143. In some examples, this may be a relay of the same messaging communications 212 to the interaction context component 143, while in other examples the automated communications component 141 may generate one or more messages representative of the messaging communications 212 and/or subsequently obtained data that is then transmitted to the interaction context component 143 (in place of, or in addition to, the messaging communications 212 shown in FIG. 2).

At operation 222, the interaction context component 143 may determine and/or generate context data and/or interaction data based on the messaging communication 212. As described in more detail herein, the interaction context component 143 may determine if the messaging communication 212 is associated with an existing interaction (e.g., interaction identifier). In some examples, this may include determining if the source 214 and the destination 216 are associated with an active interaction of the same type of communication as the messaging communication 212. If the messaging communication 212 is associated with an existing active interaction, the interaction context component 143 may associate this messaging communication 212 with the identified interaction. If not, the interaction context component 143 may generate a new interaction (e.g., interaction identifier) and associate this messaging communication 212 with the newly generated interaction.

The interaction context component 143 may also, or instead, at operation 222, determine a context for the messaging communication 212 and/or its associated interaction. As described in more detail herein, in some examples the interaction context component 143 may determine if the source 214 and the destination 216 are associated with an active context. If the messaging communication 212 is associated with an existing active context, the interaction context component 143 may associate this messaging communication 212 and/or its interaction (e.g., interaction identifier) with the identified context (e.g., context identifier). If not, the interaction context component 143 May generate a new context (e.g., context identifier) and associate this messaging communication 212 and/or its interaction (e.g., interaction identifier) with the newly generated context.

The interaction context component 143 may transmit an interaction communication 224 to the interaction communications unification component 145 that may include content 218 of the messaging communication 212 and context 226 data. The interaction communication 224 may include other data from the messaging communication 212 and/or the entirety of the messaging communication 212. The context 226 of the interaction communication 224 may include any or all context data associated with the applicable context and/or any or all interaction data associated with the applicable context. Alternatively or additionally, the context 226 may include one or more identifiers, pointers, and/or other data that may be used, for example by the interaction communications unification component 145, to determine or otherwise obtain any or all of the context data and/or interaction data associated with the applicable context.

At operation 228, the interaction communications unification component 145 may determine user data and/or any other data that may be used to identify the appropriate destination interaction interface and/or generate data for an interaction interface. For example, the interaction communications unification component 145 may determine, based on context data, a particular interaction interface or interface component that has been used for communication with the user device 110 under this context or is otherwise associated with the context. The interaction communications unification component 145 may determine user data for the user associated with the user device 110 and/or the context. The interaction communications unification component 145 may then generate instructions to present the user data and interaction data associated with the context. The interaction communications unification component 145 may transmit these instructions to the determined interaction interface.

In this example, the interaction communications unification component 145 may determine the interaction interface to be used to interact with the user device 110 is supported by the interaction interface component 149. The interaction communications unification component 145 may transmit interaction instructions 230 to the interaction interface component 149, instructing that component to generate an interface as indicated in the instruction 230, for example, by determining and presenting historical interaction data, current interaction data, user data, issue data, etc.

Further interaction 232, representing one or more communications associated with the interaction and context associated with the messaging communication 212, may be facilitated between the interface (e.g., as controlled by the interaction interface component 149) and the user device 110. During the ongoing interaction 232, one or more components of the unified communications system, such as the interaction context component 143 and/or the interaction communications unification component 145, may generate, update, and/or store interaction, context, and/or other data at operation 234 that may be used in subsequent operations.

Figure 3:
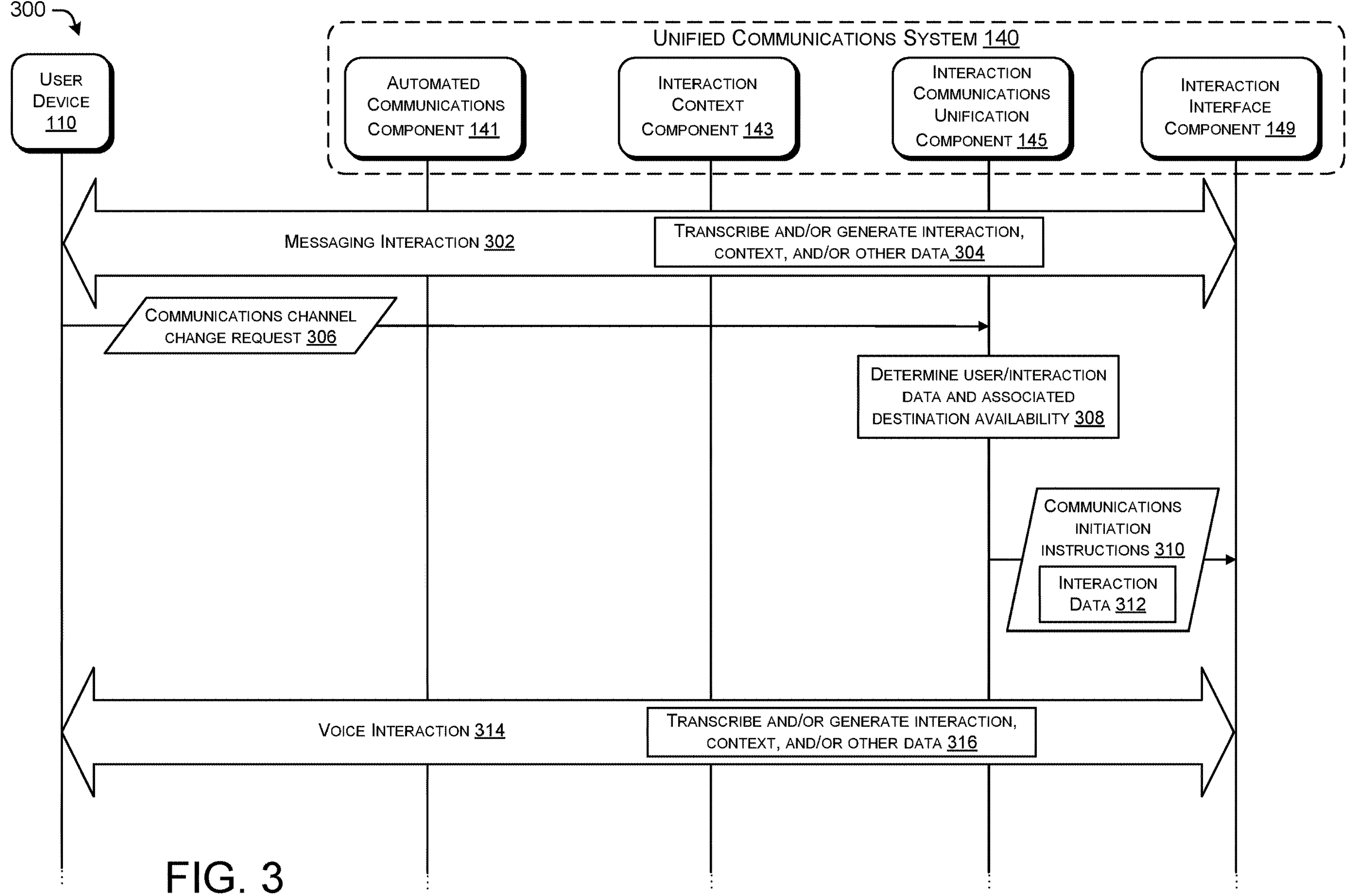
FIG. 3 is a diagram of another illustrative signal flow associated with unified multi-channel communications systems and methods according to the examples described herein.

FIG. 3 is an exemplary signal flow 300 of various messages that may be exchanged and operations that may be performed in a system performing unified multi-channel communications methods. In examples, one or more operations and signals of the signal flow 300 may be implemented by a unified multi-channel communications system, such as by using one or more of the components and systems illustrated in FIG. 1 and described above and/or by using one or more of the components and systems illustrated in FIG. 8 and described below. For example, reference may be made in this description of the signal flow 300 to devices, entities, functions, components, and/or interfaces illustrated in FIG. 1 and described in regard to that figure, including one or more components and systems associated with the unified communications system 140. One or more such components and systems can also, or instead, include those associated with the computing device 800 illustrated in FIG. 8. In other examples, one or more operations and signals of the signal flow 300 may be implemented by a combination of components described in regard to these systems and/or other systems. However, the signal flow 300 is not limited to being implemented by such components and systems, and the components and systems described herein are not limited to implementing the operations and signals of the signal flow 300.

Signal flow 300 illustrates an example of signals that may be exchanged and operations that may be performed during a switch of communications channels during an exchange of communications between a user device and a unified communications system. The user device and an interface controlled and/or configured by the interaction interface component 149 may be engaged in an ongoing messaging interaction 302 (e.g., such as interaction 232 established in the example of FIG. 2). While this interaction 302 is ongoing, one or more components of the unified communications system, such as the interaction context component 143 and/or the interaction communications unification component 145, may generate, update, and/or store interaction, context, and/or other data at operation 304.

While the messaging interaction is ongoing and/or while the associated interaction is active, the user device 110 may transmit a communications channel change request 306 to the unified communications system 140. The communications channel change request 306 may be an explicit request to change communications channel, such as a code in text content of a messaging communications or message content that may be processed (e.g., using language processing) to determine that the content represents a request to change communications channels. Alternatively, the communications channel change request 306 may be a request to communicate with the unified communications system 140 using a different communications channel. For example, wherein the messaging interaction is an SMS communications exchange, the communications channel change request 306 may be a call request to establish a voice call between the user device 110 and the unified communications system 140.

In examples, the communications channel change request 306 may be processed similarly to other messaging communications by the components 141 and/or 143 and presented to the interaction communications unification component 145 (e.g., the content of the communications channel change request 306 may ultimately be transmitted to the interaction communications unification component 145 for processing).

At operation 308, the interaction communications unification component 145 may determine user and/or interaction data that may be used to generate and/or store interaction and/or context data based on the request 306. In some examples, that may include determining the interface and/or interface component associated with the context associated with the interaction 302 and/or the request 306. For example, the interaction communications unification component 145 may store the request 306 as interaction data for the interaction associated with the interaction 302 and may indicate, in such interaction data, that the interaction is now inactive. Further at operation 308, the interaction communications unification component 145 may determine the availability of the destination interface. For example, the interaction communications unification component 145 may determine if the interface (e.g., controlled and/or configured by the interaction interface component 149) is available for voice communications (e.g., if the interface and/or the component 149 indicate that the operator of the interface is not currently on a voice call or is otherwise available to conduct a voice call. The interaction communications unification component 145 may wait until the destination interface is available before sending communication initiation instruction 310 to the interaction interface component 149 to initiate the request changed communications.

When the interaction communications unification component 145 determines to send instructions to the interaction interface component 149, the interaction communications unification component 145 may send the instructions 310 including interaction data 312. The interaction data 312 may include, or provide reference to, any interaction data associated with the context associated with the interaction 302 as well as any other context data and/or other data that may be used to generate and/or facilitate an interaction interface.

In response to receiving these instructions 310, may generate an interface and/or initiate a voice interaction 314 to exchange voice communications with the user device 110. During the ongoing interaction 314, at operation 316, one or more components of the unified communications system, such as the interaction context component 143 and/or the interaction communications unification component 145, may generate, update, and/or store interaction, context, and/or other data that may be used in subsequent operations.

Figure 4A:
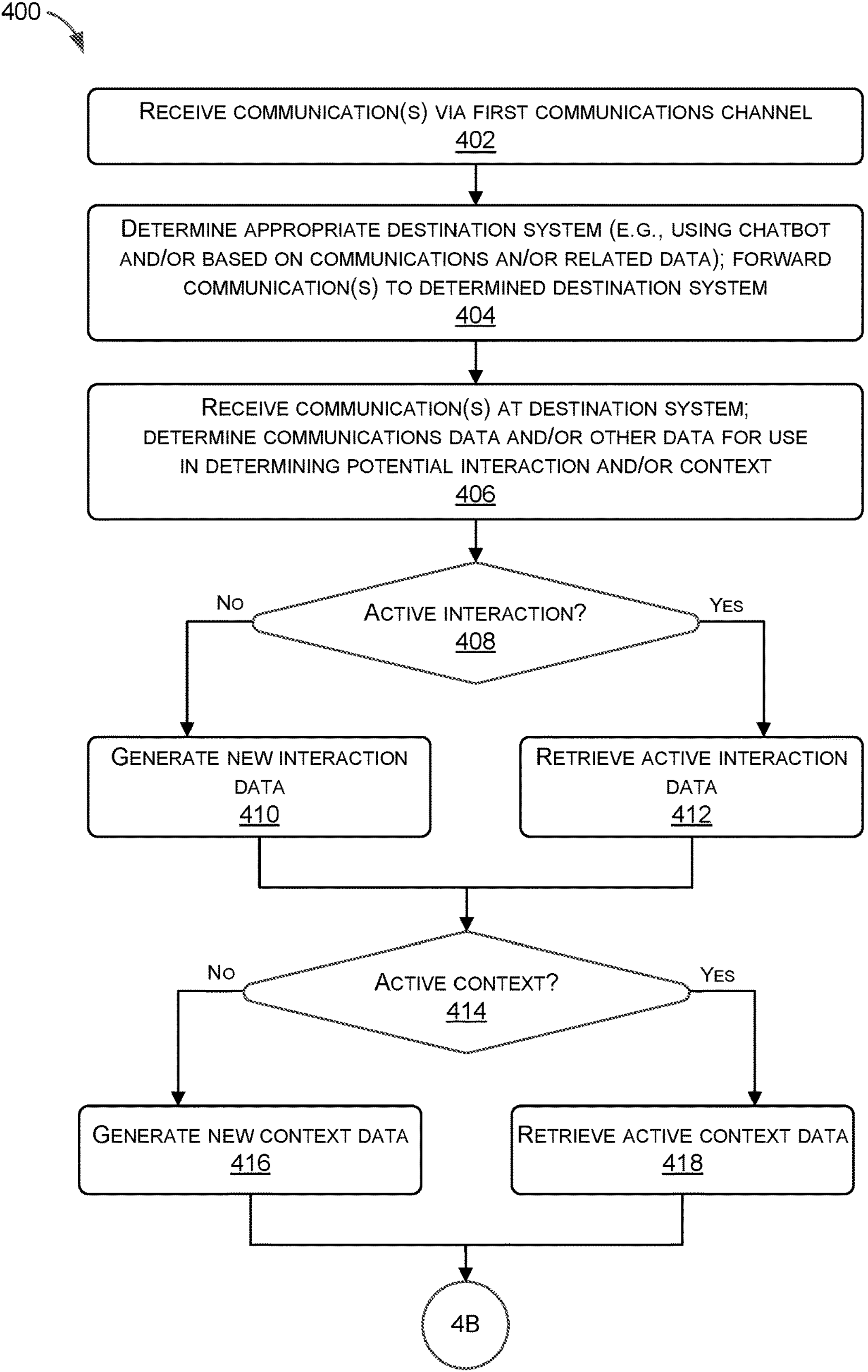
FIGS. 4A and 4B are pictorial flow diagrams illustrating an example process for establishing multi-channel communications and generating associated interaction data according to the examples described herein.
Figure 4B:
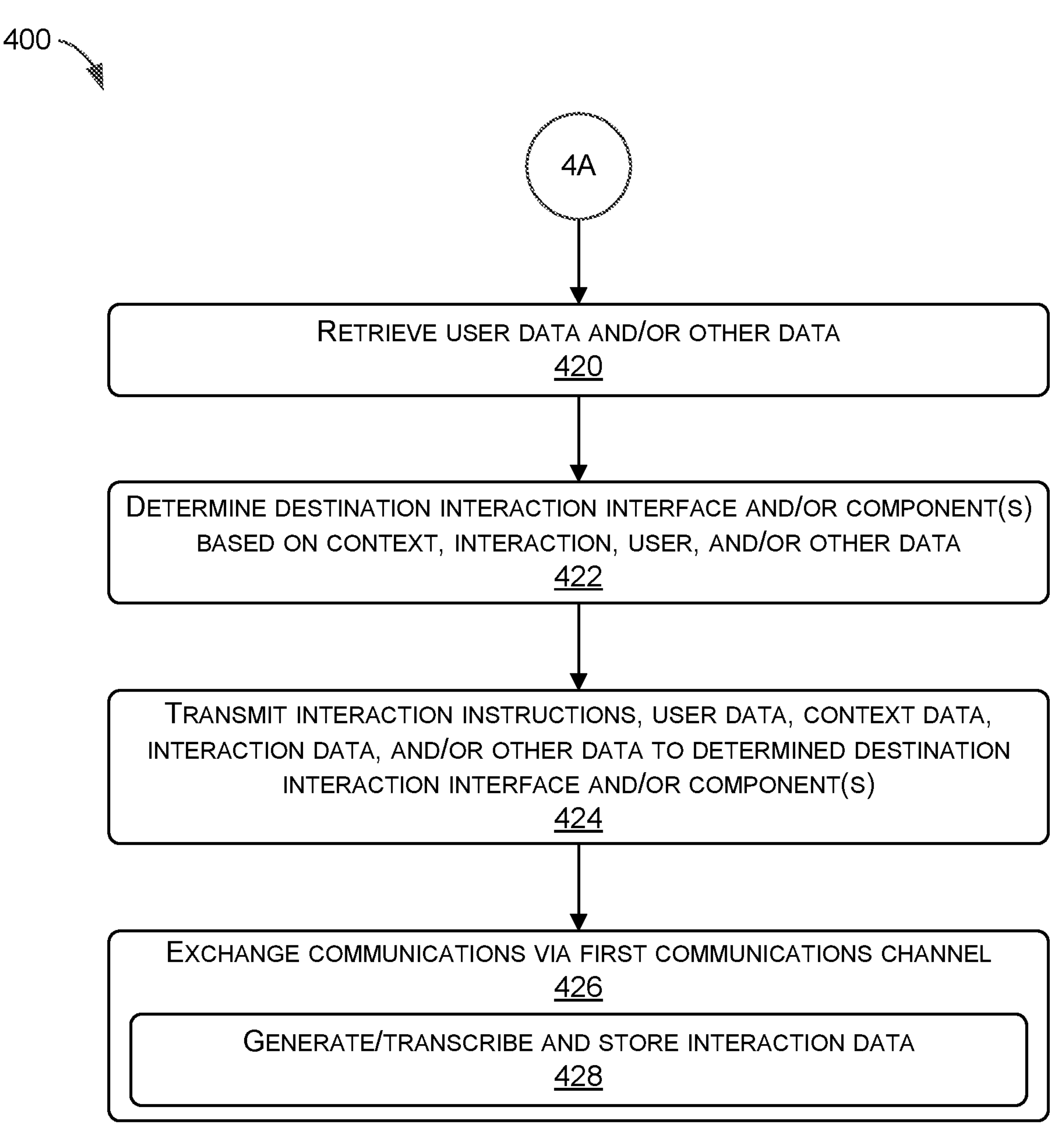

FIGS. 4A and 4B are pictorial flow diagrams of an example process 400 for determining and/or generating interaction and context data for communications with a user device in a unified multi-channel communications system. In examples, one or more operations of the process 400 may be implemented by a unified communications system, such as by using one or more of the components and systems illustrated in FIG. 1 and described above and/or by using one or more of the components and systems illustrated in FIG. 8 and described below. For example, one or more such components and systems can include those associated with the unified communications system 140 illustrated in FIG. 1. One or more such components and systems can also, or instead, include those associated with the computing device 800 illustrated in FIG. 8. In other examples, one or more operations of the process 400 may be performed by a combination of components described in regard to these systems and/or other systems. However, the process 400 is not limited to being performed by such components and systems, and the components and systems described herein are not limited to performing the operations of the process 400.

Referring now to FIG. 4A, at operation 402, one or more communications of a particular type may be received via a first communications channel. For example, a text message or multimedia message may be received at a messaging communications component. In another example, a voice call or request to establish voice communications may be received at a voice communications component. In yet another example, a communication may be received via an application, such as a messaging application configured at a social media or social network application or system, at an application communications component.

At operation 404, the system may determine the appropriate destination system for the received communication. For example, as described herein, the system may determine communications data, such as a source and/or destination identifier associated with the received communication to determine the destination system. Alternatively or additionally, the system may determine user data (e.g., based on communications data associated with the received communication) and determine the destination system based on such user data. In another example, the system may be configured to interact with a user that sent the received communication to solicit additional information that may be used to determine the destination system (e.g., "How can we help today?," "Press one for customer service, press two to open an account, . . . ," etc.). The user's response to such queries may be processed to determine a destination system. In examples, some or all of such destination systems may include a unified communications system and/or may perform the unified communications operations described herein. For example, a customer service system may perform some or all of the unified communications operations described herein while a sales support system at the same organization may also (e.g., independently) perform some or all of the unified communications operations described herein. Further at operation 404, the system may forward the communication received via the first combinations channel, and/or data based thereon, to the determined destination system.

At operation 406, the destination system may receive the communications and determine data that may be used to determine whether there is an existing interaction and/or an existing context associated with the communication. For example, contexts and/or interactions may be identified, as described herein, using various combinations of one or more of a communication's source identifier, a communication's destination identifier, a communication's communication type or channel, a timestamp of receipt of the communication, etc. At operation 406, the system may determine the data that may be associated with the communication that may be of use in identifying whether an active context and/or interaction may be associated with the communication.

At operation 408, the system may compare the data determined at operation 406 to active interaction data (e.g., interaction identifiers for active interactions) to determine if an active interaction may be associated with the communication. For example, the system may determine if there is an active interaction identifier associated with the first communication channel that includes the source identifier and destination identifier associated with the communication.

If there is no corresponding interaction identifier that may be associated with the communication, the system may generate a new interaction identifier and/or other new interaction data at operation 410 and associate the communication with that new identifier. Otherwise, if there is an active identifier that may be associated with the communication, at operation 412, the system may associate the communication with that interaction identifier.

At operation 414, the system may compare the data determined at operation 406 to active context data (e.g., context identifiers for active contexts) to determine if an active context may be associated with the interaction determined at a previous operation and/or with the communication. For example, the system may determine if there is an active context identifier that includes the source identifier and destination identifier associated with the communication and/or some portion of the interaction identifier associated with the communication.

If there is no corresponding context identifier that may be associated with the communication and/or interaction, the system may generate a new context identifier and/or other new context data at operation 416 and associate the communication and/or interaction with that new identifier. Otherwise, if there is an active context identifier that may be associated with the communication and/or interaction, at operation 418, the system may associate the communication and/or interaction with that context identifier.

Referring now to FIG. 4B, at operation 420, the system may retrieve user data and/or other data based on the communication and the determined context and/or interaction data. For example, the system may determine a particular user identifier, user data, account data, etc. that may be used to generate and/or support one or more interaction interfaces that may facilitate communications with the user.

At operation 422, the system may use this data and/or any of the context data, interaction data, and/or communication data to determine a destination interaction interface. For example, the context data and/or interaction data may indicate a particular interaction interface that may have been used for other recent communications (e.g., an interface operated by a particular operator and/or executing at a particular system or device). The system may determine, at operation 422, to provide the recently received communication and the associated data to that interface for additional communications with the sender of the received communication.

At operation 424, the system may transmit instructions to generate and/or present an interaction interface to an interface component. Such instructions may include data such as the content of the received communication, historical and/or current interaction data, contextual data, user data, etc.

At 426, the system may generate and/or execute the interface to further exchange communications with the sender. For example, the interface may allow or facilitate the transmission of a responsive communication. While subsequent communications are being exchanged, at operation 428, the system may generate further interaction data, such as transcriptions of the communications and other data that may be stored as interaction data for use in future operations.

Figure 5:
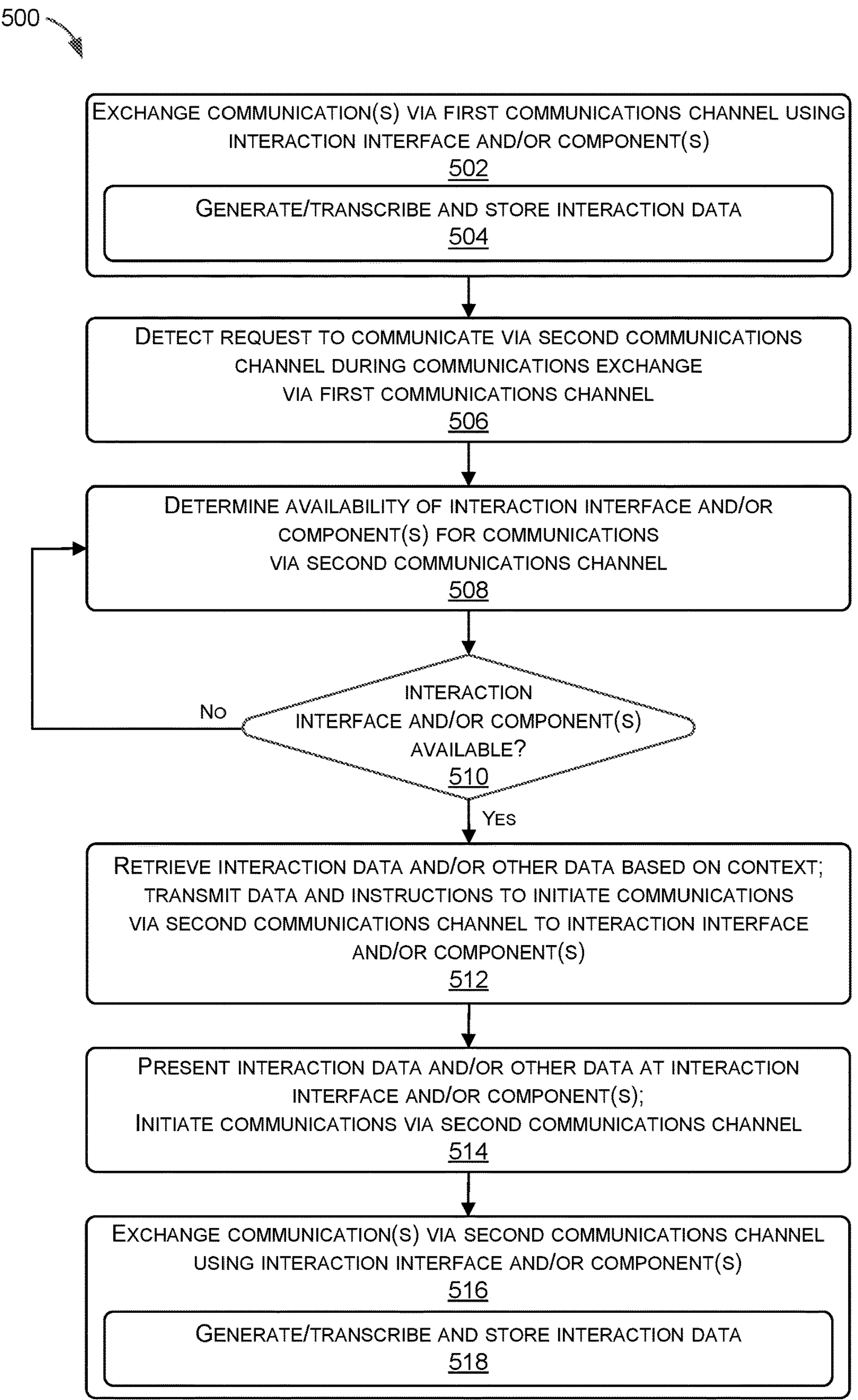
FIG. 5 is a pictorial flow diagram illustrating an example process for switching communications channels during an interaction associated with a particular context and retrieving and/or generating associated interaction data according to the examples described herein.

FIG. 5 is a pictorial flow diagram of an example process 500 for switching communications channels during communications with a user device and determining and updating interaction and context data during the exchange of communications in a unified multi-channel communications system. In examples, one or more operations of the process 500 may be implemented by a unified communications system, such as by using one or more of the components and systems illustrated in FIG. 1 and described above and/or by using one or more of the components and systems illustrated in FIG. 8 and described below. For example, one or more such components and systems can include those associated with the unified communications system 140 illustrated in FIG. 1. One or more such components and systems can also, or instead, include those associated with the computing device 800 illustrated in FIG. 8. In other examples, one or more operations of the process 500 may be performed by a combination of components described in regard to these systems and/or other systems. However, the process 500 is not limited to being performed by such components and systems, and the components and systems described herein are not limited to performing the operations of the process 500.

At operation 502, a user device and unified communications system may exchange one or more communications of a particular type using a first communications channel. For example, the system and the user device may be exchanging text messages, multimedia messages, voice data, application messaging data, etc. While such communications are being exchanged, at operation 504, the system may generate further interaction data, such as transcriptions of the communications and other data that may be stored as interaction data for use in future operations.

At operation 506, the system may detect, during the exchange of communications at operation 502 (e.g., while the interaction associated with the exchange of communications is active), a request to change communications channels to a second communications channel. This request may take any of a variety of forms, including those described herein (e.g., a text code, a touch-tone, a natural language request, etc.).

At operation 508, the system may determine the availability of the interaction interface currently engaged in exchanging communication using the first communications channel to exchange communications using the second communications channel. For example, if the request is to change from a text communications channel to a voice call, the system may determine if the interaction interface is available to support a voice call at this time, and, if not, an estimated time at which the interface may be available. Alternatively, if the request is to change from a voice communications channel to an application messaging interaction, the system may determine if the interaction interface is available to support application messaging at this time, and, if not, an estimated time at which the interface may be available. Interface availability may be, but is not necessarily, a proxy for operator availability.

At operation 510, the system may determine if the interaction interface is currently available. If not, the process 500 may return to operation 508 to reevaluate the availability of the interaction interface. The system may also, at operation 508, notify the sender of the request to change communications channels (e.g., via the first communications channel) of the status of the communications channel change. This may take the form of an informative text message, a voice notification, hold music, etc.

If, at operation 510, the system determines that the interaction interface is available for exchanging communications with the requestor, at 512 the system may retrieve any updated or additional data (e.g., interaction data, context data, user data, etc.) that may be used for exchanging communications using the second communications channel and transmit that data along with instructions to initiate communications using the second communications channel to the interaction interface. Alternatively, the instructions may be instructions to respond to communications initiated by the requestor on the second communications channel where the request to change communications channels is in the form of an initial communication using the second communications channel.

At operation 514, the updated interaction, context, and/or other data may be presented at the interaction interface, which may initiate or otherwise facilitate communications with the requestor using the second communications channel.

At operation 516, the user device of the requestor and the unified communications system may exchange one or more communications using the second communications channel. For example, the system and the user device may begin exchanging voice data where the first communications channel was text, vice versa, etc. While such communications are being exchanged, at operation 518, the system may generate further interaction data, such as transcriptions of the communications and other data that may be stored as interaction data for use in future operations.

Figure 6:
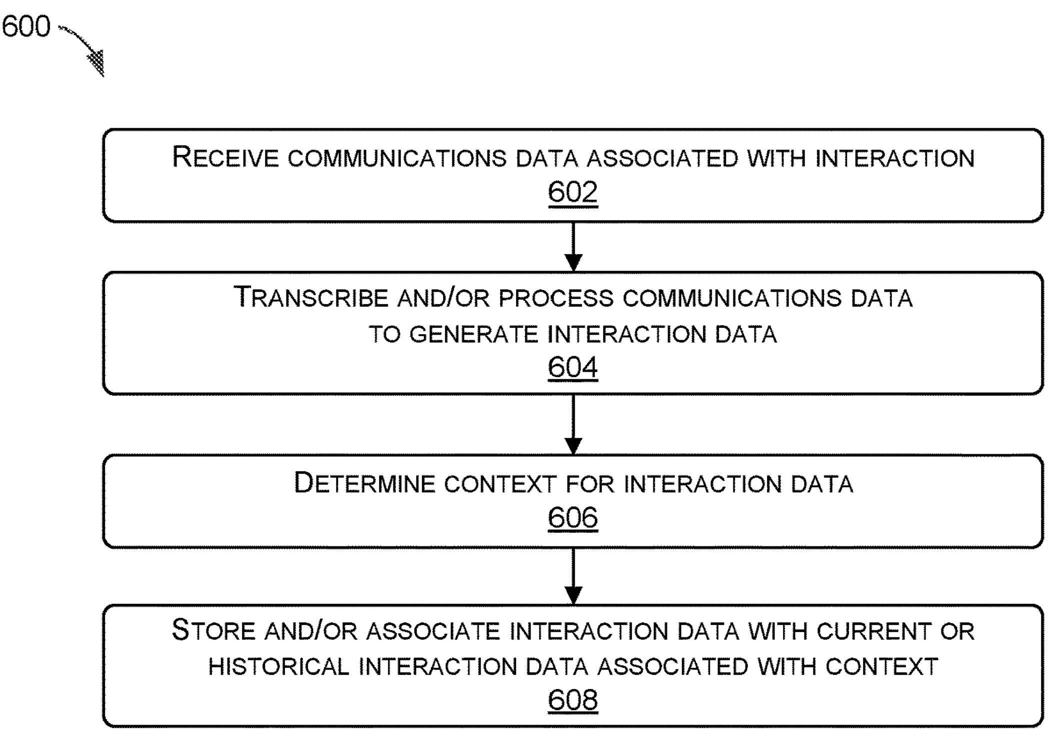
FIG. 6 is a pictorial flow diagram illustrating an example process for associating communications data received via a communications channel with a particular context and historical interaction data according to the examples described herein.

FIG. 6 is a pictorial flow diagram of an example process 600 for generating interaction data and associating such data with a context during communications during the exchange of communications in a unified multi-channel communications system. In examples, one or more operations of the process 600 may be implemented by a unified communications system, such as by using one or more of the components and systems illustrated in FIG. 1 and described above and/or by using one or more of the components and systems illustrated in FIG. 8 and described below. For example, one or more such components and systems can include those associated with the unified communications system 140 illustrated in FIG. 1. One or more such components and systems can also, or instead, include those associated with the computing device 800 illustrated in FIG. 8. In other examples, one or more operations of the process 600 may be performed by a combination of components described in regard to these systems and/or other systems. However, the process 600 is not limited to being performed by such components and systems, and the components and systems described herein are not limited to performing the operations of the process 600.

At operation 602, a component of a unified communications system may receive communications data associated with an interaction. For example, the component may receive a text message or data representing a portion of a voice call, in some examples along with other data. This accompanying data may include an interaction identifier and/or other interaction data that may allow the component to associate the communications data with an interaction. Alternatively, the component may use portions of the communications data (e.g., source identifier, destination identifier, communications type, etc.) to determine an interaction identifier for the communications data.

At operation 604, the component may process the communications data to generate interaction data. For example, the component may transcribe audio content included in the communications data to generate text data that may then be associated with the interaction and/or interaction identifier. Similarly, the component may process text, audio, images, video, etc. from the communications content to store and associate with the interaction identifier. Such processing may include removing extraneous and/or personal information.

At operation 606, the system may determine a context for the interaction. As described, herein the component may evaluate active context data to determine if there is an active context identifier that corresponds to some portion of the interaction identifier. Other means may be used to determine an active context to be associated with the interaction data. At operation 608, the component may store the interaction data as current interaction data associated with the determined context, for example, for an interaction that is currently active. Alternatively, at operation 608, the component may store the interaction data as historical interaction data associated with the determined context, for example, for an interaction that is currently active.

Figure 7:
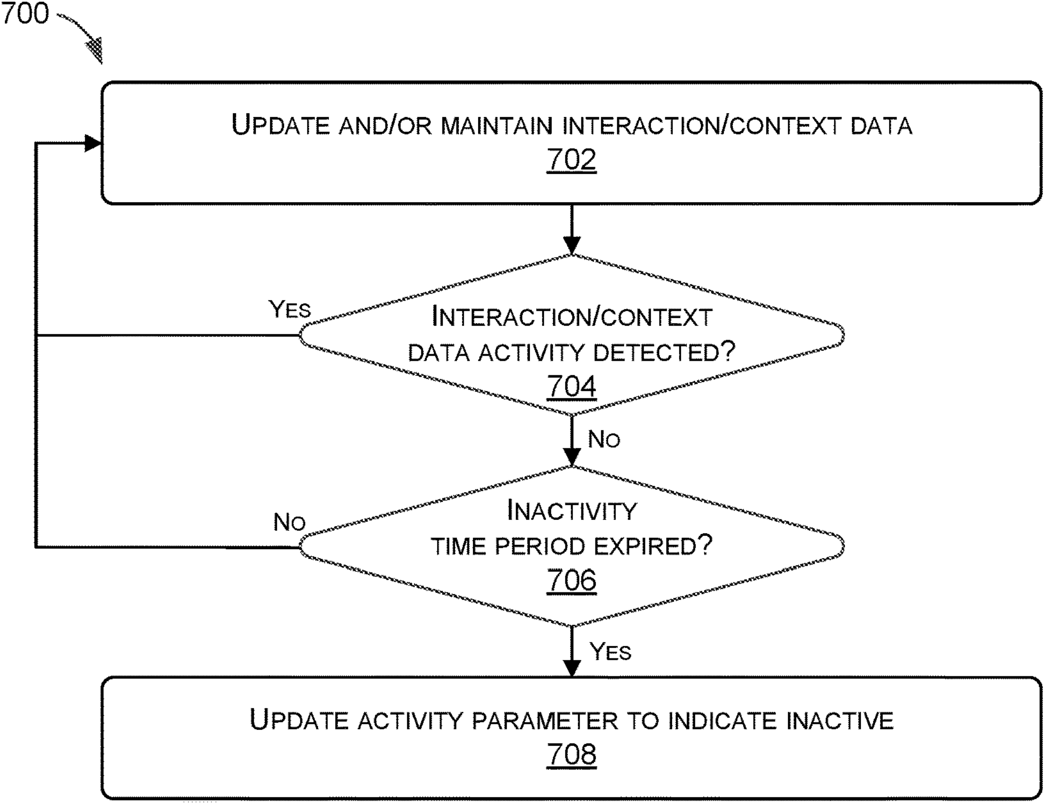
FIG. 7 is a pictorial flow diagram illustrating an example process for determining and setting activity status for historical interaction data associated with a particular context according to the examples described herein.

FIG. 7 is a pictorial flow diagram of an example process 700 for updating interaction data and/or context data based on activity and responsively deactivating a context and/or interaction in a unified multi-channel communications system. Note that the process 700 may be applicable to interactions and/or contexts and may be performed by various components to determine activity status of either or both contexts and interactions. In examples, one or more operations of the process 700 may be implemented by a unified communications system, such as by using one or more of the components and systems illustrated in FIG. 1 and described above and/or by using one or more of the components and systems illustrated in FIG. 8 and described below. For example, one or more such components and systems can include those associated with the unified communications system 140 illustrated in FIG. 1. One or more such components and systems can also, or instead, include those associated with the computing device 800 illustrated in FIG. 8. In other examples, one or more operations of the process 700 may be performed by a combination of components described in regard to these systems and/or other systems. However, the process 700 is not limited to being performed by such components and systems, and the components and systems described herein are not limited to performing the operations of the process 700.

At operation 702, interaction and/or context data may be maintained and/or updated. For example, as described in more detail herein, at operation 702, a communication may be associated with a particular interaction by updating or creating interaction data that represents or includes the communication and/or data based on the communication (e.g., transcription of the communication) and associating such data with an interaction identifier. Similarly, operation 702 may include updating or creating context data by associating an interaction with a context identifier, creating a context identifier, updating context data, etc.

At operation 704, the system may determine whether data activity associated with the context or interaction has been detected. For example, the creation of an interaction (e.g., interaction identifier) or context (e.g., context identifier) may be detected as interaction or context data activity, respectively. An update of data associated with an interaction or context may be detected as interaction or context data activity, respectively. Any other activity that accesses and/or alters interaction data or context data may be detected as interaction or context data activity, respectively. In examples, any such activity may qualify as interaction or context data activity, while in other examples, (e.g., only) particular types of activity may as interaction or context data activity. For instance, modifying data may be a detectable data activity, while merely accessing (reading) such data may not.

If, at operation 704, interaction or context data activity has been detected, the process 700 may return to operation 702 to continue to update and/or maintain the interaction or context data. Included in this operation may be a reset of a timer or an update of a timestamp representing a time of most recent activity for the interaction or context data.

If, at operation 704, interaction or context data activity has not been detected, at operation 706 the system may determine if an inactivity time period associated with the interaction or context data has expired. For example, interaction or context data may be configured with an inactivity time period representing an amount of time of inactivity that triggers a change of activity status for the data from "active" to "inactive." If there has been no data activity involving the interaction or context data for the inactivity time period following the most recent data activity, the system may (e.g., automatically) update an activity status parameter associated with the interaction or context data to indicate that the interaction or context data is inactive. Other means of indicating the activity status of interaction or context data may also, or instead be used.

Particular types of interactions and/or contexts may have different inactivity time periods. For example, an interaction associated with messaging communications may become inactive after a period of no messaging activity (e.g., an hour, two hours, 24 hours, etc.). Alternatively, an interaction associated with voice communications may become inactive in response to a detection of termination of the voice communications. Similarly, a context associated with an insurance claim may become inactive after a relatively extended period of no context data activity (e.g., 24 hours, a week, a month, etc.), while a context associated with a customer support issue may become inactive after a relatively shorter period of no context data activity (e.g., 4 hours, 24 hours, 48 hours, etc.).

Note that an interaction interface (e.g., as controlled by an operator) may manually inactivate an interaction and/or a context. For example, when the interface detects activation of a control indicating that a particular issue associated with a context is resolved, the system may responsively modify the context data to indicate that the context is inactive. Similarly, when the interface detects activation of a control indicating that a communication session (e.g., voice call) associated with an interaction is complete, the system may responsively modify the interaction data to indicate that the interaction is inactive. In examples, the interface may also, or instead, reactivate a context and/or interface based on interface control activation(s).

If, at operation 706, the system determines that the inactivity time period for the interaction or context has not expired, the process 700 may return to operation 702 to continue to update and/or maintain the interaction or context data. However, if the inactivity time period for the interaction or context has expired, at operation 708, the system may update an activity parameter or other data associated with the interaction or context to indicate that the interaction or context is inactive.

Figure 8:
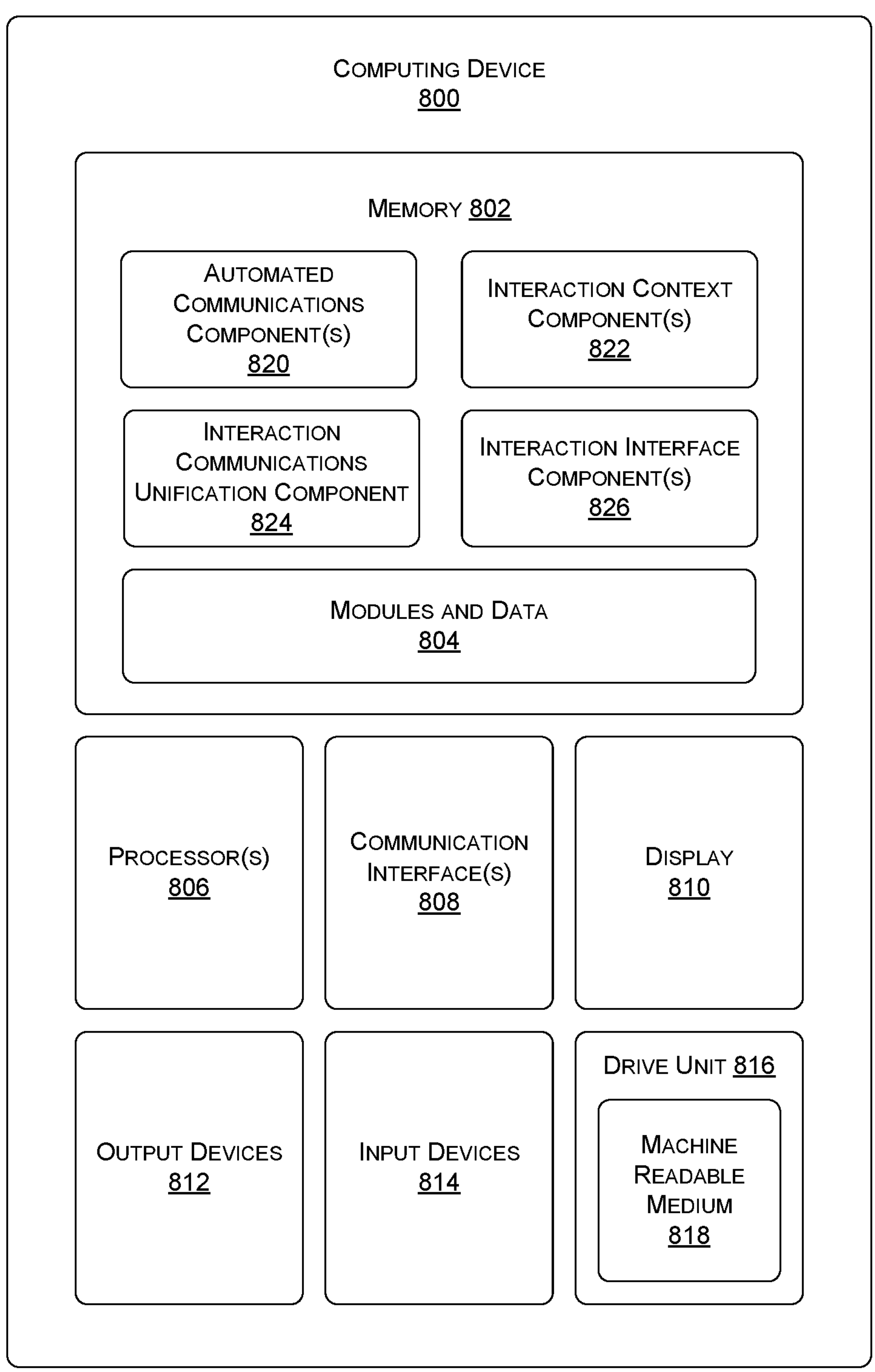
FIG. 8 shows an example system architecture for a computing device that may be used to implement the systems and architectures described herein.

FIG. 8 shows an example system architecture for a computing device 800 that may be implemented as (e.g., part of) any of the systems and devices described herein and/or may perform any of the operations and processes described herein. For example, the computing device 800 may represent any of the systems, devices, and components illustrated in FIG. 1. The computing device 800 may also represent any system configured to implement any of the signals and operations described in regard to FIGS. 2-7 and/or any other operation described herein. The computing device 800 may be a server, computer, mobile device (e.g., smartphone, smartwatch, laptop), or any other type of computing device that may execute any of the operations described herein. In some examples, operations as described herein may be distributed among and/or executed by multiple computing devices 800.

A computing device 800 can include memory 802. In various examples, the memory 802 can include system memory, which may be volatile (such as RAM), non-volatile (such as ROM, flash memory, etc.), or some combination of the two. The memory 802 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 800. Any such non-transitory computer-readable media may be part of the computing devices 800.

The memory 802 may include modules and data 804 needed to perform operations as described herein by one or more computing devices 800. Included with such modules and data 804 and/or also stored in the memory 802 may be one or more automated communications components 820, one or more interaction context components 822, one or more interaction communications unification components 824, and/or one or more interaction interface components 826. The automated communications component(s) 820 may perform any one or more of the operations related to automated communications and destination system determinations as described herein (e.g., as described for automated communications component 141 illustrated in FIG. 1). The interaction context component(s) 822 may perform any one or more of the operations related to determining, generating, and/or associating context and interaction data as described herein (e.g., as described for interaction context component 143 illustrated in FIG. 1). The interaction communications unification component(s) 824 may perform any one or more of the operations related to collecting and unifying data (e.g., interaction data, user data, etc.) associated with a particular context and generating data for use by an interaction interface component as described herein (e.g., as described for interaction communications unification component 145 illustrated in FIG. 1). The interaction interface component(s) 826 may perform any one or more of the operations related to generating, transmitting and/or providing data and/or instructions for one or more interaction interfaces as described herein (e.g., as described for interaction interface component 149 illustrated in FIG. 1).

One or more computing devices 800 may also have processor(s) 806, communication interface(s) 808, display (s) 810, output device(s) 812, input device(s) 814, and/or drive unit(s) 816 that may include one or more machine-readable media 818.

In various examples, the processor(s) 806 can be a central processing unit (CPU), a graphics processing unit (GPU), both a CPU and a GPU, or any other type of processing unit. Each of the one or more processor(s) 806 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 806 may also be responsible for executing computer applications stored in the memory 802, which can be associated with common types of volatile (RAM) and/or nonvolatile (ROM) memory.

The communication interfaces 808 may include transceivers, modems, interfaces, antennas, telephone connections, and/or other components that can transmit and/or receive data over wired and/or wireless networks, telephone lines, and/or other connections.

The display(s) 810 can be any one or more of a liquid crystal display or any other type of display commonly used in computing devices. For example, the display(s) 810 may include a touch-sensitive display screen that may also act as an input device or keypad, such as for providing a soft-key keyboard, navigation buttons, and/or any other type of input.

The output device(s) 812 may include any sort of output devices known in the art, such as the display(s) 810, one or more speakers, a vibrating mechanism, and/or a tactile feedback mechanism. Output devices 812 may also include one or more ports for one or more peripheral devices, such as headphones, peripheral speakers, and/or a peripheral display.

The input device(s) 814 may include any sort of input devices known in the art. For example, input device(s) 814 may include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine-readable media 818 of drive unit(s) 816 may store one or more sets of instructions, such as software or firmware, that embodies any one or more of the methodologies or functions described herein. The instructions can also reside, completely or at least partially, within the memory 802, processor(s) 806, and/or communication interface(s) 808 during execution thereof by the one or more computing devices 800. The memory 802 and the processor(s) 806 may also constitute machine-readable media 818.

With the techniques described herein, data received via, or otherwise associated with multiple communications channels may be more accurately associated with a particular context and more efficiently stored and provided for processing using an interaction interface. Furthermore, the communications channels may be changed while maintaining communications consistency with a user, thereby improving user satisfaction and increasing the efficiency of data collection and processing.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

exchanging, by a unified communications system processor, text messaging communications with a user device using an interaction interface and a text messaging communications channel;

generating and storing, by the unified communications system processor, interaction data based at least on part on the text messaging communications;

determining, by the unified communications system processor and based at least in part on the text messaging communications, a context identifier;

associating, by the unified communications system processor, the interaction data with the context identifier;

detecting, by the unified communications system processor, a textual communications channel change request in a text messaging communication received from the user device via the text messaging communications channel during the text messaging communications;

determining, by the unified communications system processor and based at least in part on data associated with the context identifier, the interaction interface;

based at least in part on the textual communications channel change request, transmitting, from the unified communications system processor to the interaction interface, instructions to initiate a voice communications session with the user device using a voice communications channel; and exchanging, by the unified communications system processor, voice communications with the user device using the interaction interface and the voice communications channel.

2. The method of claim 1, wherein generating the interaction data comprises associating content included in the text messaging communications with the interaction data.

3. The method of claim 1, wherein transmitting the instructions to the interaction interface comprises transmitting at least a subset of the data associated with the context identifier to the interaction interface.

4. The method of claim 1, wherein exchanging the text messaging communications with the user device using the text messaging communications channel comprises facilitating an exchange of the text messaging communications between the user device and the interaction interface via the unified communications system processor.

5. The method of claim 1, wherein the textual communications channel change request comprises a textual code.

6. The method of claim 5, wherein detecting the textual communications channel change request in the text messaging communication comprises determining the textual code using natural language processing of the text messaging communication.

7. The method of claim 1, wherein detecting the textual communications channel change request in the text messaging communication comprises determining the textual communications channel change request using natural language processing of the text messaging communication.

8. The method of claim 1, further comprising:

exchanging voice communications with the user device using the voice communications channel; and generating and storing second interaction data based at least on part on the voice communications.

9. The method of claim 8, wherein generating the second interaction data comprises:

generating transcription content based at least in part on the voice communications; and associating the transcription content with the second interaction data.

10. A non-transitory computer-readable medium comprising instructions that, when executed by one or more processors, cause the one or more processors to:

exchange text messaging communications with a user device using an interaction interface and a text messaging communications channel;

generate and store interaction data based at least on part on the text messaging communications;

determine, based at least in part on the text messaging communications, a context identifier;

associate the interaction data with the context identifier;

receive a textual communications channel change request in a text messaging communication received from the user device via the text messaging communications channel;

determine, based at least in part on data associated with the context identifier; the interaction interface;

based at least in part on the textual communications channel change request, transmit instructions to the interaction interface to initiate a voice communications session with the user device using a voice communications channel; and exchange voice communications with the user device using the interaction interface and the voice communications channel.

11. The non-transitory computer-readable medium of claim 10, wherein instructions to the interaction interface to initiate the voice communications session comprise instructions to initiate the voice communications session as a high priority voice communications session in a voice communications session queue for the interaction interface.

12. The non-transitory computer-readable medium of claim 10, further comprising instructions that, when executed by the one or more processors, cause the one or more processors to generate, in response to exchanging the text messaging communications, an interaction identifier for the interaction data based at least on part on a user device identifier and an identifier of a unified communications system associated with the one or more processors.

13. The non-transitory computer-readable medium of claim 12, wherein the user device identifier comprises a user device telephone number and the identifier of the unified communications system comprises a unified communications system telephone number.

14. The non-transitory computer-readable medium of claim 12, wherein the instructions that cause the one or more processors to associate the interaction data with the context identifier comprise instructions that, when executed by the one or more processors, cause the one or more processors to associate the interaction identifier with an interface identifier representing the interaction interface.

15. The non-transitory computer-readable medium of claim 14, wherein the instructions that cause the one or more processors to determine the interaction interface comprise instructions that, when executed by the one or more processors, cause the one or more processors to determine the interaction interface by determining that the interaction identifier is associated with the interface identifier.

16. A unified communications system comprising:

one or more processors; and a non-transitory memory storing computer-executable instructions that, when executed, cause the one or more processors to:

exchange text communications with a user device using an interaction interface and a text communications channel;

generate and store interaction data based at least on part on the text communications;

determine, based at least in part on the text communications, a context identifier;

associate the interaction data with the context identifier;

receive a textual communications channel change request in a text communication received from the user device via the text communications channel;

determine, based at least in part on data associated with the context identifier; the interaction interface;

based at least in part on the textual communications channel change request, transmit instructions to the interaction interface to initiate a voice communications session with the user device using a second voice communications channel; and exchange voice communications with the user device using the interaction interface and the voice communications channel.

17. The unified communications system of claim 16, wherein the context identifier is determined further based at least on part a user device identifier and an identifier of the unified communications system.

18. The unified communications system of claim 16, wherein the computer-executable instructions further comprise instructions that, when executed, cause the one or more processors to transmit at least a subset of the interaction data to the interaction interface.

19. The unified communications system of claim 16, wherein the computer-executable instructions further comprise instructions that, when executed, cause the one or more processors to:

determine user data for a user associated with a user associated with the user device; and transmit at least a subset of the user data to the interaction interface.

20. A system for determining service status data notifications, the system comprising:

means for exchanging text messaging communications with a user device using an interaction interface and a text messaging communications channel;

means for generating and storing interaction data based at least on part on the text messaging communications;

means for determining, based at least in part on the text messaging communications, a context identifier;

means for associating the interaction data with the context identifier;

means for detecting a textual communications channel change request in a text messaging communication received from the user device via the text messaging communications channel;

means for determining, based at least in part on data associated with the context identifier, the interaction interface;

means for transmitting, based at least in part on the textual communications channel change request, instructions to the interaction interface to initiate a voice communications session with the user device using a voice communications channel; and exchanging voice communications with the user device using the interaction interface and the voice communications channel.

* * * * *